United States Patent
Amos et al.

(10) Patent No.: US 10,498,026 B2
(45) Date of Patent: Dec. 3, 2019

(54) METHOD OF REDUCING PHASE ABERRATION IN AN ANTENNA SYSTEM WITH ARRAY FEED

(71) Applicant: EUTELSAT S A, Paris (FR)

(72) Inventors: Sonya Amos, Paris (FR); Hector Fenech, Issy les Moulineaux (FR)

(73) Assignee: EUTELSAT S A, Paris (FR)

( * ) Notice: Subject to any disclaimer, the term of this patent is extended or adjusted under 35 U.S.C. 154(b) by 598 days.

(21) Appl. No.: 14/966,034

(22) Filed: Dec. 11, 2015

(65) Prior Publication Data
US 2016/0172752 A1 Jun. 16, 2016

(30) Foreign Application Priority Data
Dec. 12, 2014 (EP) .................................... 14307009

(51) Int. Cl.
*H01Q 3/20* (2006.01)
*H04B 17/12* (2015.01)
*H01Q 1/28* (2006.01)
*H01Q 25/00* (2006.01)

(52) U.S. Cl.
CPC ............... *H01Q 3/20* (2013.01); *H01Q 1/288* (2013.01); *H01Q 25/007* (2013.01); *H04B 17/12* (2015.01)

(58) Field of Classification Search
CPC ........ H01Q 3/20; H01Q 1/288; H01Q 25/007; H04B 17/12
See application file for complete search history.

(56) References Cited

U.S. PATENT DOCUMENTS

| | | | | |
|---|---|---|---|---|
| 4,203,105 A | * | 5/1980 | Dragone | H01Q 19/192 343/781 P |
| 4,364,052 A | * | 12/1982 | Ohm | H01Q 3/2658 343/781 CA |
| 4,618,866 A | * | 10/1986 | Makino | H01Q 25/007 343/779 |
| 6,320,553 B1 | | 11/2001 | Ergene | |
| 6,392,611 B1 | * | 5/2002 | Smith | H01Q 1/288 343/756 |
| 9,601,827 B2 | * | 3/2017 | Yamamoto | H01Q 3/18 |
| 2010/0231442 A1 | * | 9/2010 | Craig | H04B 7/0851 342/354 |

(Continued)

OTHER PUBLICATIONS

Zimmerman, M., S.W. Lee, B. Houshmand, Y. Rahmat-Samii and R. Acosta, "A Comparison of Reflector Antenna Designs for Wide Angle Scanning," NASA Technical Memorandum 101459, Feb. 1989.*

(Continued)

*Primary Examiner* — Dameon E Levi
*Assistant Examiner* — Jennifer F Hu
(74) *Attorney, Agent, or Firm* — Pillsbury Winthrop Shaw Pittman LLP

(57) ABSTRACT

A method for reducing phase aberration in an antenna system for satellite, the antenna system being configured to receive and/or emit at least a spot beam, the antenna system including a reflector; an array feed including a plurality of feeds configured to illuminate the reflector in emission mode and/or configured to receive illumination from the reflector in reception mode; a trimming system configured to adjust the position of the reflector with respect to the array feed, the method including adjusting the position of the reflector with respect to the array feed in order to correct phase aberration in the spot beam.

10 Claims, 2 Drawing Sheets

(56) References Cited

U.S. PATENT DOCUMENTS

2016/0372835 A1* 12/2016 Toso .................. H01Q 19/192

OTHER PUBLICATIONS

Decision to grant a European Patent, dated Oct. 5, 2018 (Year: 2018).*
Flax, S.W., and M. O'Donnell, "Phase-Aberration Correction Using Signals From Point Reflectors and Diffuse Scatterers: Basic Principles," IEEE Transactions on Ultrasonics, Ferroelectrics, and Frequency Control, vol. 35, No. 6, pp. 758-767. (Year: 1988).*
Extended European Search Report as issued in European Patent Application No. 14307009,2, dated May 26, 2015.

\* cited by examiner

METHOD OF REDUCING PHASE ABERRATION IN AN ANTENNA SYSTEM WITH ARRAY FEED

CROSS-REFERENCE TO RELATED APPLICATIONS

This application claims priority to European Patent Application No. 14307009.2, filed Dec. 12, 2014, the entire content of which is incorporated herein by reference in its entirety.

FIELD

The present invention relates to a method of reducing phase aberration in a reconfigurable multiple beam satellite reflector antenna with an array feed.

BACKGROUND

U.S. Pat. No. 6,392,611 describes an array fed multiple beam antenna system and method for use on an orbiting spacecraft carrying a communication system. The antenna system includes a reflector and a relatively small array feed compared to the reflector. The array feed has feeds comprising radiators that illuminate the reflector and that are disposed in a focal plane of the reflector. A power division network excites the radiators of the feeds. The antenna system is capable of very wide scan angle operation and may be used to provide multiple spot beam coverage over the surface of the Earth viewed from a synchronous orbit spacecraft. Phase aberration normally associated with scanning is corrected by adjusting excitation coefficients of each array feed.

However, the known systems are not accurate enough such that the optimum performance of the radiated beam is not achieved.

SUMMARY

An aspect of the invention is directed to a method enabling to reduce the impact of phase aberration and scan loss in a reconfigurable multiple beam antenna.

To that purpose, an aspect of the invention proposes a method for reducing phase aberration in an antenna system for satellite, the antenna system being configured to receive and/or emit at least a spot beam, the antenna system comprising:
- a reflector;
- an array feed comprising a plurality of feeds configured to illuminate the reflector in emission mode and/or configured to receive illumination from the reflector in reception mode;
- a trimming system configured to adjust the position of the reflector with respect to the array feed;
- the method comprising a step of adjusting the position of the reflector with respect to the array feed in order to correct phase aberration in the spot beam.

In controlling the amplitude and phase and reducing the phase aberration and scan loss of a signal the method enables to determine and improve the power radiated onto the surface of the earth and thus a form of performance of the system. Due to reciprocity of antennas this control of the antenna also allows to improve reception of a signal received by the antenna from the Earth.

The method according to the first aspect of the invention may also comprise one or several of the following features, taken individually or according to all possible technical combinations.

In an embodiment, the antenna system may comprise a control system configured to control an excitation coefficient of each of the feeds, the method further comprises a step of correcting the phase aberration by adjusting the excitation coefficient of each of feeds.

The excitation coefficients are, in an embodiment, the amplitude and/or the phase of each of the feeds.

In an embodiment, the antenna system is configured to emit and/or receive a spot beam of nominal location with respect to the Earth surface, the method comprising the following steps:
- detecting an offset between the current location of a spot beam emitted and/or received by the antenna system and the nominal location;
- adjusting the position of the reflector with respect to the array feed in order to reduce the impact of phase aberration on the spot beam emitted and/or received by the antenna system.

A feedback loop is, in an embodiment, used in which the performance is improved as the reflector position is moved in fine steps to reduce the impact. The position is set when no further improvement is possible.

In an embodiment, the amplitude and phase of the beam generated by the antenna system is detected and processed by three ground terminals located on the surface of the Earth. These terminals, separated by a distance are used to accurately coordinate and 'triangulate' the beam location on the Earth. The signal from the antenna is then adjusted via command from the ground station by the method according to the first aspect of the invention until the signal is adjudged to be at its optimum with no further improvement possible.

The reflector is, in an embodiment, scanned over a number of fixed offsets within the ability of the tuning of the trimming mechanism.

In an embodiment, the antenna system is configured to emit and/or receive a spot beam of nominal location with respect to the Earth surface, the method further comprising the following steps:
- controlling the amplitude and phase of the radiating elements in order to form at least two beams of chosen direction and shape on the reflector;
- detecting that at least one of the beams is steered away from its nominal location;
- adjusting the position of the reflector to find a position of the reflector at which the beams operate according to a performance criterion.

The position of the reflector is, in an embodiment, adjusted using the accuracy of the trimming mechanism to find the best compromised performance of the two, or more, beams, i.e. the position of the reflector at which the beams operate with the best corresponding performance using a performance criteria.

According to different embodiments, the performance criterion may be the width and/or the gain.

According to an embodiment, the at least two beams are equally weighted in phase and amplitude, the position of the reflector being adjusted in order to compensate for the scan loss attributed to the beams being away from a focal point of the antenna.

Multiple beams may be equally weighted, compensating in performance as each beam is away from the optimum boresight i.e. since there is more than one beam, they are inherently away from the focal point of the antenna where optimum performance of the beam is achieved. The amplitude and phase of the feed array excites the beams to locate them on the Earth surface. The trimming mechanism is then used to optimize the performance of the beams in order to compensate for the scan loss attributed to the beams being away from the focal point and boresight of the reflector. The gain or performance indicator is monitored until all beams are performing at their maximum capability in the presence of the others.

According to another embodiment, the antenna system is configured to emit and/or receive at least two spot beams, the method comprising the following steps:
  adjusting the position of the reflector in order to form a first beam of nominal performance,
  adjusting the phase and amplitude of the feeds in order to compensate for scan loss of at least a second beam.

One or more beams are conditionally weighted via a peak control in which the maximum of the beams is maintained. The peak performance of a first beam is achieved through adjustment of the position of the reflector. The amplitude and phase of the subsequent beams are adjusted in order to maintain the performance of the first beam whilst forming the other beams. Fine tuning of the reflector is subsequently utilized to compensate for the compromised performance and maximize the gain of the other beams.

Similarly the beams are conditionally weighted by a minimum control of the beams. A minimum threshold of performance is used for the first beam achieved through adjustment of the amplitude and phase components of the antenna array while forming the other beams. Fine tuning of the reflector is subsequently utilized to compensate for the compromised performance of the beams whilst maintaining this minimum level of beam one, typically in terms of antenna gain of the beam.

According to different embodiment:
  the position of the reflector may be adjusted in order to form at least a beam of chosen width; the reflector is moved along a focal axis of the reflector in order to control the width of at least one beam;
  the position of the reflector is adjusted in order to form a beam of chosen gain.

DETAILED DESCRIPTION

Figure 1:
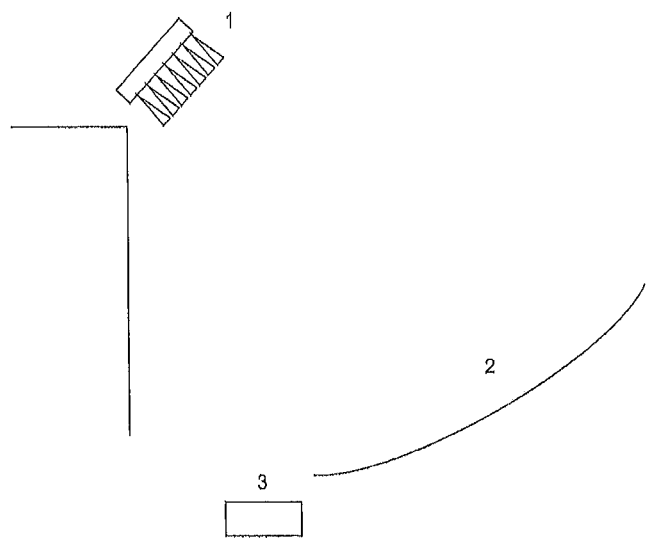
FIG. 1 represents an antenna system to which a method according to an embodiment is applicable.

FIG. 1 represents an antenna system designed for use with a communication system disposed on a spacecraft. The antenna system comprises a reflector 2 and an array feed 1. The array feed 1 includes a plurality of feeds configured to illuminate the reflector in emission mode and/or configured to receive illumination from the reflector in reception mode. The antenna system also comprises a control system configured to excite each of the feeds in emission mode and/or to receive excitation of each of the feeds in reception mode. The control system is configured to control the excitation coefficient of each of the feeds. It can then control the amplitude and phase of each of the feeds.

During transmission, the feeds are configured to radiate energy on the reflector in order to produce multiple spot beams. The array feed 1 is then configured to form one or more spot beams, projected by the reflector onto the earth surface. The spot beams are scanned across a field of regard by appropriately positioning the feed array and by controlling the amplitude and phase distribution associated with a particular spot beam. Controlling the amplitude and phase distributions produced by the feeds allows different beam distributions to be realized for different scan positions to optimize the beam shapes generated by the multiple beam antenna system over a very wide coverage region.

During reception, the feeds are configured to receive energy reflected by the reflector. Multiple spot beams are reflected by the reflector to the feeds.

The antenna system is configured to emit and/or receive a beam of nominal location with respect to the surface of Earth. However, the antenna system is capable of very wide scan angle operation. As a matter of fact, the beam locations are not fixed and as such the arrangement is capable of providing steered beams. The feed arrangement provides this flexibility through control of the amplitude and phase of the feed array. As the locations of the beams moves away from the optimum location, a phase aberration is observed, associated with scan loss. Typically, these phase aberrations are compensated by adjustment in the amplitude and phase weighting of the feeds as described in U.S. Pat. No. 6,392,611.

According to an embodiment of the invention, the phase aberration normally associated with scanning is corrected by steering the reflector with respect to the array feed in order to improve the performance of the antenna system.

To that purpose, the antenna system comprises a trimming mechanism 3 configured to adjust the position of the reflector with respect to the array feed. The trimming mechanism may be an ADTM (Antenna Deployment and Trimming Mechanism) or an ATS (Antenna Trimming System). Typically this trimming mechanism are used in the accurate positioning of reflectors in single offset or Gregorian configurations in which the reflectors steer beams to the correct geographical location. The beams may be shaped via shaping of the reflector shell or a spot beam formed from the ellipse, again defined by the antenna geometry and reflector size and shape. According to the present method, the trimming mechanisms are also applied to Array Fed Reflector configurations. This allows the antenna system to control and steer beam(s) that have been generated by the feed array to an optimum position with a high accuracy and through the technological advancements, provide improved performance. In this way the present method fully utilizes the hardware capabilities as the losses normally observed by such antenna systems are compensated for by both the control of the excitation of the array feeds and of the trimming mechanism.

The antenna system combines then the feed arrangement with the fine accuracy trimming mechanism such that the scan loss of the beams may be reduced and subsequently optimized through repointing of the reflector.

Figure 2:
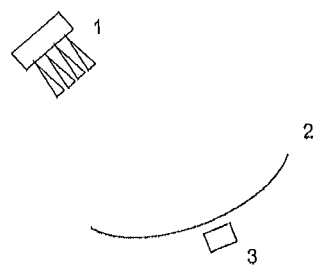
FIG. 2 represents another antenna system to which a method according to an embodiment is applicable.

According to an embodiment, represented at FIG. 1, this trimming mechanism may be fixed at the edge of the reflector 2. According to another embodiment, represented at FIG. 2, the trimming mechanism may be fixed at the center of the reflector 2. Trimming mechanisms are now available in the industry that provide a precision of at least 0.0025° per step. Such mechanisms implement the method according to an embodiment of the invention. The capability of fine adjustment of the reflector makes the pointing of the reflector much more accurate.

The phase aberration normally associated with scanning is corrected by adjusting the position of the reflector with respect to the array feed.

More precisely, the antenna system is configured to emit and/or receive a spot beam of nominal location with respect to the Earth surface.

The method may then first comprise detecting an offset between the current location of a spot beam emitted and/or received by the antenna system and the nominal location. The method may then comprise adjusting the position of the reflector with respect to the array feed in order to reduce the impact of phase aberration on the spot beam emitted and/or received by the antenna system. To that purpose a feedback loop is used in order to adjust the position of the reflector while the phase aberration is not suppressed. The feedback loop enables then to improve the performance of the antenna system as the reflector position is moved in fine steps to reduce the impact of scan loss. The position is set when no further improvement is possible or when a selected threshold figure of merit is achieved.

According to an embodiment, the amplitude and phase of the spot beam generated by the antenna system is detected and processed by three ground terminals located on the surface of the Earth. These terminals, separated by a distance, are used to accurately coordinate and 'triangulate' the spot beam location on the Earth. If an offset between the current spot beam location and the nominal spot beam location is detected, the signal from the antenna system is adjusted, for example via command from the ground station by steering the reflector with respect to the array feed until the signal is adjudged to be at its optimum with no further improvement possible.

The method may further be applied in the configuration of an operating scenario of a telecommunication system with multiple beam requirements.

Figure 3:
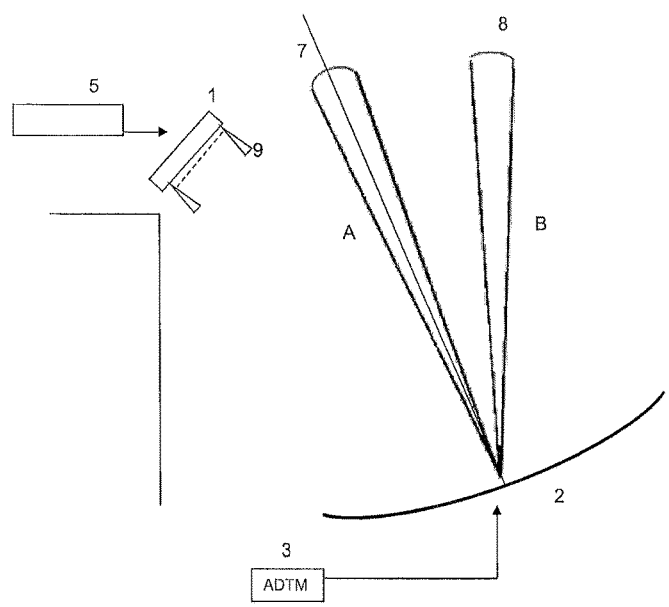
FIG. 3 represents another antenna system to which a method according to an embodiment is applicable.

As illustrated in FIG. 3, a beam A is steered to the nominal location 7 corresponding to the optimum position corresponding to the focal point of the reflector. A second beam B is steered over a second location corresponding to an interfering location 8. The array feed is used to form a nominal beam 9. The amplitude and phase weightings of the feeds are adjusted by the control system 5 to provide the appropriate beam excitations.

The position of the reflector 2 with respect to the array feed 1 is optimized through mechanical steering of the reflector in order to:
  further best fit the beam performances to the beam locations
  reduce the impact of scan loss
  compensate and reduce active mechanical deformation of the reflector surface.

As represented at FIG. 3, when the antenna system emits several beams, the position of the reflector may be adjusted using the fine accuracy of the trimming mechanism to find the best compromised performance of the two, or more, beams, i.e., the position at which the beams operate with the best corresponding performance using the performance criteria example given previously where the peak or minimum performance of the beams are monitored, for instance in terms of the antenna gain observed and optimized through fine adjustment of the reflector.

Two embodiments of the invention are detailed below.

According to a first embodiment, multiple beams may be equally prioritized, compensating in performance as each beam is away from its optimum boresight, i.e., since there is more than one beam, they are inherently away from the focal point of the antenna where optimum performance of the beam is achieved. The amplitude and phase of the feed array excites the beams to locate them on the Earth. The trimming mechanism is then used to optimize the performance of the beams away from their optimal location in order to compensate for the scan loss attributed to the beams being away from the focal point and boresight of the antenna. The gain, or performance indicator, is monitored until all beams are performing at their maximum capability in the presence of the others or when the beams meet a selected threshold performance level.

Figures 4A, 4B:
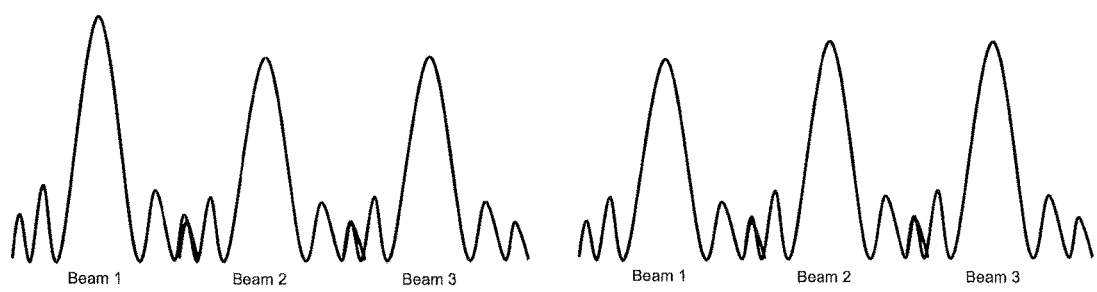
FIG. 4a schematically represents three beams emitted by the antenna system of FIG. 3.
FIG. 4b schematically represents three other beams emitted by the antenna system of FIG. 3.

As illustrated in FIG. 4a, the peak performance of beam 1 is achieved through the method according to claim 1. The amplitude and phase of the subsequent beams are adjusted in order to maintain the performance of beam 1 while forming beams 2, 3 etc. Fine tuning of the reflector is subsequently utilized to compensate for the compromised performance and maximize the gain of beams 2, 3, etc.

According to a second embodiment, one or more beams are conditionally weighted via a peak control in which the maximum of the beam is maintained. FIG. 4b illustrates a method in which one or more beams are conditionally weighted via a control of a minimum performance requirement. A minimum threshold performance of beam 1 is achieved through the method according to claim 1. The amplitude and phase of subsequent beams are adjusted in order to maintain this threshold performance of beam 1 whilst forming the beams 2, 3 etc. Fine tuning of the antenna reflector is subsequently utilized to maximize the gain of the beams 2, 3 etc as far as possible. The performance of beams 2, 3 etc are further maximized through the method in claim 5 in which the amplitude and phase of the array elements are further optimized to maximize the performance of beams 2,3 while maintaining the threshold requirement of beam 1.

In an embodiment, the method further comprises a step of adjusting the position of the reflector with respect to the array feed in order to control the width of at least one beam emitted by the antenna system. To that purpose, in an embodiment, the method comprises a step of moving the reflector along its focal axis in order to modify the width of at least one beam emitted by the antenna system. As a matter of fact, the trimming mechanism of the reflector may be used to further optimize the width of beams generated by the array elements. The trimming mechanism is thus capable of moving the reflector along the focal plane axis towards or away from the array feed. This has the effect of changing the width of the beam observed on the Earth.

The trimming mechanism is capable of steering the reflector but also capable of moving the reflector in the plane towards the array feed of the antenna. This in turn alters the width of the corresponding beam reflected and radiated to Earth. The pattern degradation and beam squint observed by scanned beams can be reduced through the optimization of the beam as the reflector is adjusted in small steps along this plane until the best performance is achieved.

The performance of multiple beams may therefore be conditioned according to the previously detailed method in which the performance can be conditioned on the basis of width as well as gain. A feedback loop is used in which the performance is improved as the reflector position is moved in fine steps in the axis of the focal plane to reduce the impact of scan loss and beam squint through improvement of the beam width. The position is set when no further improvement is possible.

In an embodiment, the amplitude and phase of the beam generated by the antenna system is detected and processed by three ground terminals located on the surface of the Earth. These terminals, separated by a distance are used to accurately coordinate and 'triangulate' the beam location on the Earth. The signal from the antenna is then adjusted via command from the ground station by the method according to the first aspect of the invention until the signal is adjudged to be at its optimum with no further improvement possible.

In an embodiment, the reflector is scanned over a number of fixed offsets within the ability of the tuning of the trimming mechanism.

In an embodiment, the antenna system is configured to emit and/or receive a spot beam of nominal location with respect to the Earth surface, the method further comprising the following steps:

controlling the amplitude and phase of the radiating elements in order to form at least two beams of chosen direction and shape on the reflector;

detecting that at least one of the beam is steered away from its nominal location;

adjusting the position of the reflector to find a position of the reflector at which the beams operate according to a performance criteria;

adjusting the position of the reflector in the direction of the focal plane to find a position of the reflector at which the beams operate according to a performance criteria.

In an embodiment, the position of the reflector is adjusted using the accuracy of the trimming mechanism to find the best compromised performance of the two, or more, beams, i.e. the position of the reflector at which the beams operate with the best corresponding performance using a performance criteria.

Consequently, the proposed method utilizes the trimming mechanism in order to further improve the antenna system performance and agility compared to systems of the prior art that compensate in terms of amplitude and phase of the array coefficients only.

Furthermore, the repointing of the reflector may be mechanically used in combination with the amplitude and phase weightings of the feed array to further optimize the antenna system performance in the presence of scan loss. Without recent advancements in technology, gimballing systems could be used in the global pointing and steering of beams but did not have sufficient resolution in their trimming capabilities to enable small adjustments to be made to compensate losses observed and therefore maximize performance. The proposed method may also be combined with the method of the prior art in order to further improve the performance of the antenna system. In that embodiment, the method further comprises a step of adjusting the amplitude and phase weightings of the radiating elements of the array in order to further reduce the impact of the phase aberration on the beam.

While the present invention has been particularly described with reference to the embodiments, it should be appreciated by those of ordinary skill in the art that changes and modifications in form and details may be made without departing from the scope of the invention.

The invention claimed is:

1. A method for reducing phase aberration in an antenna system for receiving and/or emitting at least a spot beam, the antenna system including a reflector; an array feed comprising a plurality of feeds illuminating the reflector in emission mode and/or receiving illumination from the reflector in reception mode; and a trimming system adjusting a position of the reflector with respect to the array feed, the method comprising:

adjusting the position of the reflector with respect to the array feed with the trimming system in order to correct phase aberration in the spot beam.

2. The method according to claim 1, wherein the antenna system comprises a control system controlling an excitation coefficient of each of the feeds, the method further comprising correcting the phase aberration by adjusting the excitation coefficient of each of the feeds.

3. The method according to claim 1, wherein the antenna system emits and/or receives a spot beam of nominal location with respect to the Earth surface, the method comprising:

detecting an offset between the current location of a spot beam emitted and/or received by the antenna system and the nominal location;

adjusting the position of the reflector with respect to the array feed in order to reduce the impact of phase aberration on the spot beam emitted and/or received by the antenna system.

4. The method according to claim 1, wherein the antenna system emits and/or receives a spot beam of nominal location with respect to the Earth surface, the method further comprising:

controlling an amplitude and phase of radiating elements of the array in order to form at least two beams of chosen direction and shape on the reflector;

detecting that at least one of the beams is steered away from its nominal location;

adjusting the position of the reflector to find a position of the reflector at which the beams operate according to a performance criteria.

5. The method according to claim 4, wherein the at least two beams are equally weighted in phase and amplitude, the position of the reflector being adjusted in order to compensate for the scan loss attributed to the beams being away from a focal point of the antenna.

6. The method according to claim 4, wherein the antenna system emits and/or receives at least two spot beams, the method comprising:

adjusting the position of the reflector in order to form a first beam of nominal performance, adjusting the phase and amplitude of the feeds in order to compensate for scan loss of at least a second beam.

7. The method according to claim 1, wherein the position of the reflector is adjusted in order to form at least a beam of chosen width.

8. The method according to claim 7, wherein the reflector is moved along a focal axis of the reflector in order to control the width of at least one beam.

9. The method according to claim 1, wherein the position of the reflector is adjusted in order to form a beam of chosen gain.

10. The method according to claim 1, wherein the trimming system is provided at a center of the reflector.

* * * * *